United States Patent [19]

Shinkle

[11] 4,448,377

[45] May 15, 1984

[54] MOUNTING ARRANGEMENT FOR AN INERTIAL MEASUREMENT UNIT

[75] Inventor: Kurt D. Shinkle, Germantown, Tenn.

[73] Assignee: The United States of America as represented by the Secretary of the Air Force, Washington, D.C.

[21] Appl. No.: 379,806

[22] Filed: May 19, 1982

[51] Int. Cl.³ .......................................... F16M 11/04
[52] U.S. Cl. .................................... 248/178; 248/183
[58] Field of Search ............... 248/178, 183, 476, 278; 33/318, 275 G; 74/479

[56] References Cited

U.S. PATENT DOCUMENTS

| 103,417 | 5/1870 | Bliss | 248/183 |
|---|---|---|---|
| 378,430 | 2/1888 | Carpenter . | |
| 525,356 | 9/1894 | Nelson | 248/183 X |
| 917,799 | 4/1909 | Saegmuller | 248/183 |
| 1,177,165 | 3/1916 | Akeley . | |
| 1,460,344 | 6/1923 | Kager | 248/183 X |
| 1,919,554 | 7/1933 | Howell | 248/183 |
| 2,423,282 | 7/1947 | Aubey | 248/183 |
| 3,236,153 | 2/1966 | Newcomb | 248/183 X |
| 3,536,284 | 10/1970 | Chickering, Jr. | 248/183 |

Primary Examiner—Ramon S. Britts
Assistant Examiner—Sarah A. Lechok
Attorney, Agent, or Firm—Donald J. Singer; John R. Flanagan

[57] ABSTRACT

In a mounting arrangement for an instrument, such as an inertial measurement unit, a mounting frame is pivotably mounted to a platform for rotation about a vertical axis and a support frame is rotatably mounted to the mounting frame for rotation about a horizontal axis. The support frame supports the instrument. A horizontal lock and motion assembly interconnects the mounting frame and platform, and allows adjustment of the angular position of the mounting frame about the vertical axis relative to the platform when the mounting frame is locked to the platform. A vertical lock and motion assembly interconnects the support frame and mounting frame, and allows adjustment of the angular position of the support frame about the horizontal axis relative to the mounting frame when the support frame is locked to the mounting frame.

6 Claims, 6 Drawing Figures

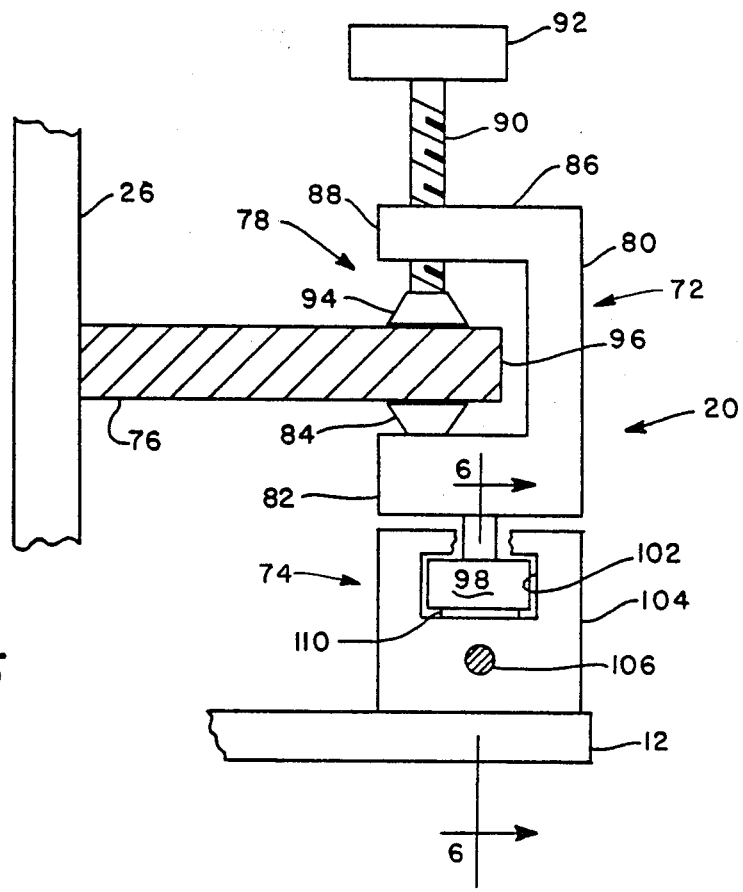
_Fig. 5_
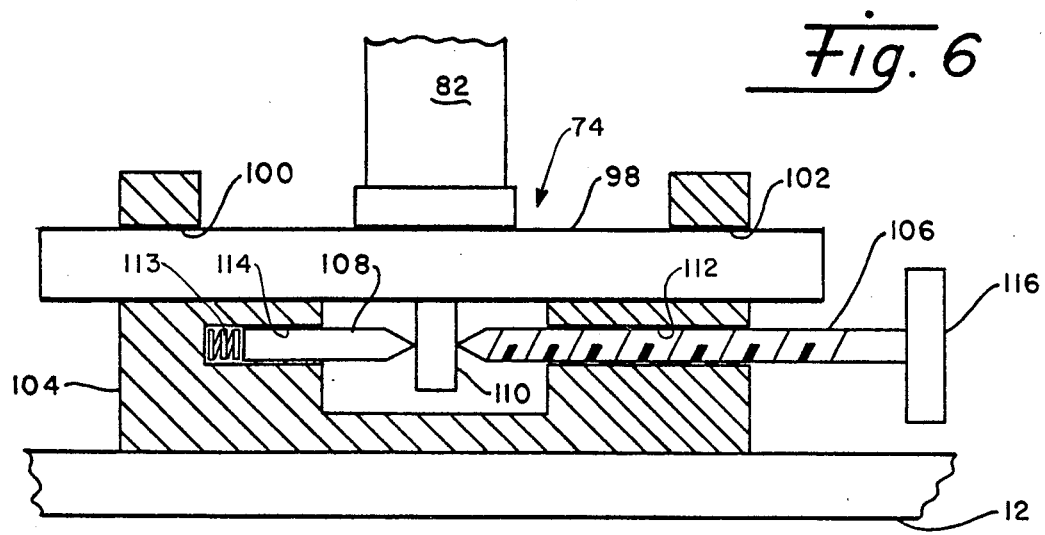
_Fig. 6_

MOUNTING ARRANGEMENT FOR AN INERTIAL MEASUREMENT UNIT

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to mounting of instruments, such as an inertia measurement unit, and, more particular, is concerned with a mounting arrangement which provides the capability of slow motion adjustment about panning (vertical) and tilting (horizontal) axes.

2. Description of the Prior Art

The mounting of instruments of various types to provide for freedom of movement about two orthogonal axes is an old, well known art. U.S. Pat. Nos. 378,430 issued in 1888 to Carpenter and 1,177,165 issued in 1916 to Akeley disclose early arrangements for mounting instruments, such as cameras of various types, for movement about horizontal and vertical axes. These arrangements also include features for clamping or holding the instrument at the desired position.

More recently, in 1970 an arrangement for mounting a distance-measuring device for movement in vertical and horizontal directions, for clamping the device at a desired position, and for fine adjustment of the vertical angular position of the device even when it is clamped, was disclosed in U.S. Pat. No. 3,536,248 to Chickering, Jr.

For certain applications, instruments must be of a size and weight which allow them to fit within very tight space constraints, for example when inertial measurement units used in geodetic surveying operations are carried in small helicopters. These applications require a mounting arrangement for the instrument which provides slow motion adjustment capabilities about both horizontal and vertical axes, while being of rugged construction so as to withstand the impact forces and vibrations to be expected in mobile environments.

While the arrangements of the aforementioned patents may accomplish their intended purposes, they do not appear to be fully suited to fulfill the constraints, requirements and environmental parameters expected of mounting arrangements for typical instruments used in mobile geodetic surveying operations. Therefore, a need exists for an alternative mounting arrangement which includes a composite of features tailored to these particular applications.

SUMMARY OF THE INVENTION

The present invention provides an instrument mounting arrangement designed to satisfy the aforementioned needs. The arrangement allows movement of the instrument about two orthogonal axes without introducing translational movements of the instrument center. As a unique feature of the arrangement, a pair of slow motion mechanisms designed to be manually manipulated with maximum mechanical advantage are provided for adjusting the angular position of the instrument about its axes of movement when the instrument is otherwise frictionally clamped or locked to the frame structure of the mounting arrangement.

Accordingly, the present invention is directed to lock and motion assemblies incorporated into an instrument mounting arrangement having a first frame for supporting the instrument, a second frame mounting the first frame and therewith the instrument for movement about a first axis, and a platform mounting the second frame and therewith the first frame and instrument for movement about a second axis extending in generally orthogonal relationship to the first axis. A first of the lock and motion assemblies interconnects the platform and second frame, while a second of the assemblies interconnects the first frame and the second frame.

More particularly, the first lock and motion assembly includes first means for locking the second frame to the platform, and first means for movably adjusting the angular position of the second frame relative to the platform about the second axis when the second frame is locked to the platform. Similarly, the second lock and motion assembly includes second means for locking the first frame to the second frame, and second means for movably adjusting the angular position of the first frame relative to the second frame about the first axis when the first frame is locked to the second frame.

BRIEF DESCRIPTION OF THE DRAWINGS

FIG. 5 is an enlarged fragmentary side elevational view of the horizontal lock and motion assembly in the arrangement of FIG. 1.

FIG. 6 is a fragmentary elevational view, partly in section, taken along line 6—6 of FIG. 5.

DETAILED DESCRIPTION OF THE INVENTION

Figure 1:
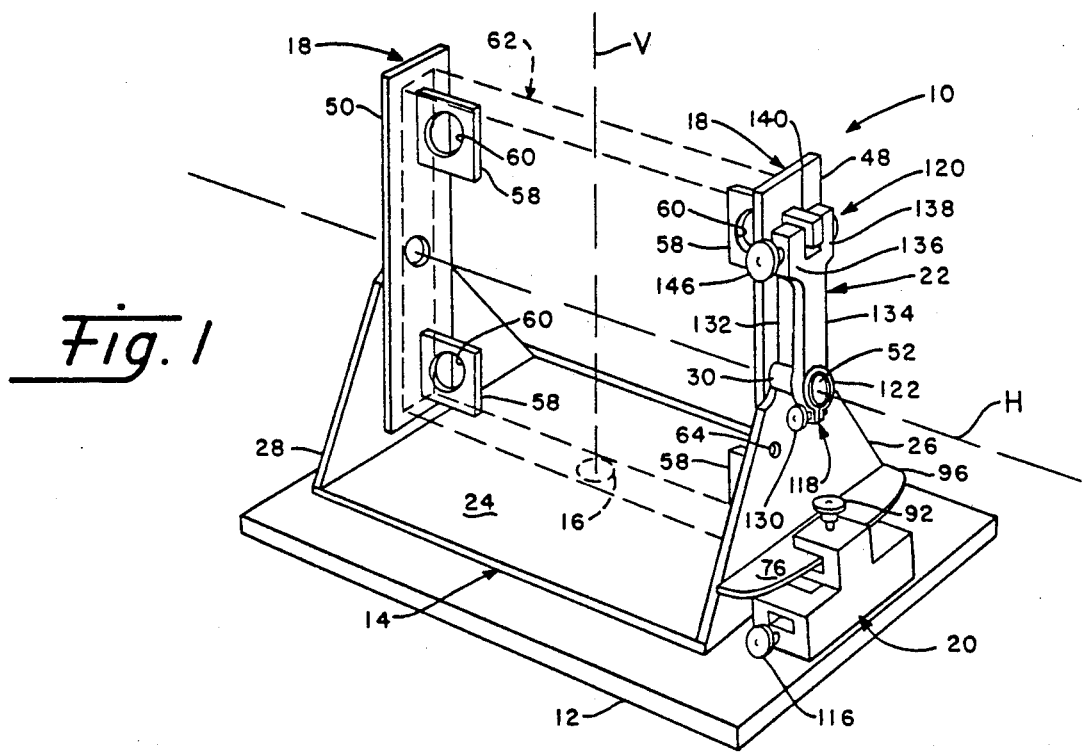
FIG. 1 is a perspective view of the instrument mounting arrangement of the present invention, with the position of the instrument being shown in phantom outline.

Referring now to the drawings, and more particularly to FIG. 1, there is shown the preferred embodiment of the instrument mounting arrangement of the present invention, being generally designated 10. The mounting arrangement 10 includes a platform 12 attachable to any suitable surface. For instance, in the particular application intended for the mounting arrangement, the platform is attached to a seat in a helicopter. Also included in the arrangement 10 is a U-shaped mounting frame 14 rotatably coupled by bearing means 16 to the platform 12 for rotational or panning-type movement (in a generally horizontal plane) about vertical axis V defined by the bearing means. Still further, a support frame 18 of the arrangement 10 is mounted by the U-shaped mounting frame 14 for rotational or tilting-type movement (in a generally vertical plane) about horizontal axis H. Finally, the mounting arrangement 10 includes a pair of lock and motion assemblies: (1) a first or horizontal lock and motion 20 interconnecting the platform 12 and mounting frame 14; and (2) a second or vertical lock and motion assembly 22 interconnecting the mounting frame 14 and support frame 18.

The U-shaped mounting frame 14 is formed by a horizontal base plate 24 and a pair of upstanding right and left mounting plates 26 and 28 fixed on opposite ends of the base plate 24. The mounting plates have a triangular, upwardly tapered configuration. Bearing means 16 which rotatably couples the mounting frame 14 to the platform interconnects the base plate 24 to the platform 12 at central locations of each.

Figure 3:
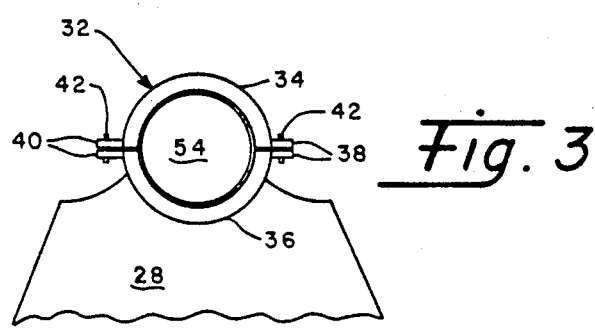
FIG. 3 is an end elevational view taken along line 3—3 of FIG. 2.
Figure 2:
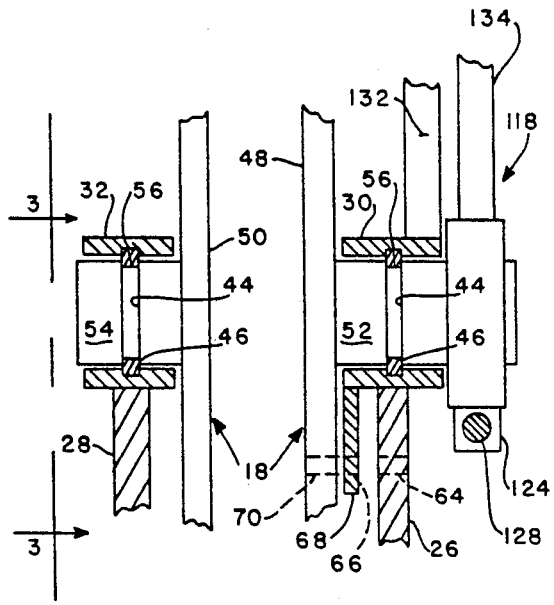
FIG. 2 is an enlarged fragmentary side elevational view, partly in section, of portions of the support and mounting frames of the arrangement, as well as parts of the vertical lock and motion assembly thereof, in the arrangement of FIG. 1.

For mounting the support frame 18, the generally upstanding right and left mounting plates 26, 28 have affixed at their upper ends respective right and left two-piece collars 30 and 32, more fully illustrated in FIGS. 2 and 3. Each of the collars 30, 32 are comprised by identical upper and lower semi-cylindrical parts 34, 36 fastened together at pairs of tabs 38, 40 at opposite ends of each of the collar parts 34 and 36 by pins 42. Also a continuous annular groove 44 is defined at a central region on the internal surface of each collar 30, 32 by the parts 34, 36 thereof when fitted together. The groove 44 of each collar receives and confines an outer portion of an annular bushing 46, the purpose of which will become apparent below.

The support frame 18 is comprised by right and left support members 48 and 50 which have affixed at central locations thereon respective right and left outwardly-projecting stub shafts 52 and 54. The right and left collars 30, 32 on the corresponding mounting plates 26, 28 of the mounting frame 14 receive the corresponding stub shafts 52, 54 of the support frame 18, as seen in collapsed form in FIG. 2, for mounting the support frame for movement about the horizontal axis H. Each stub shaft 52, 54 has a circumferential groove 56 defined at a central location therealong in the outer surface of the shaft which matches or aligns with the groove 44 in each corresponding one of the collars 30, 32. The groove 56 of each shaft receives and confines an inner portion of the annular bushing 46. In such manner the collars 30, 32 and shafts 52, 54 and thereby the mounting frame 14 and support frame 18, respectively, are maintained together in a preset axial position along the horizontal axis H.

Each of the support members 48, 50 has affixed to its upper and lower ends an inwardly-projecting square bracket 58 with a central hole 60 defined therein for mounting the instrument, such as an inertial measurement unit schematically represented in phantom outline at 62 in FIG. 1, between the support members 48, 50 for rotation therewith about the horizontal axis H. By the relationships of the frame structures of the mounting arrangement 10 described up to this point, it is also apparent the support frame 18 and instrument 62 will rotate with the mounting frame 14 relative to the platform 12 about the vertical axis V.

During periods of flight between survey points the inertial measurement unit 62 must be returned to the same predetermined orientation relative to the helicopter. This is achieved by providing an origin lock position in which the support frame 18 and instrument 62 are immobilized by positively locking the support frame 18 to the mounting frame 14. For this purpose, a pair of aligned holes 64, 66 defined in the right mounting plate 26 and in a tab 68 depending from right collar 30 can be aligned with a hole 70 defined in the right support member 48 by moving the support frame 18 to a vertical position, and then a locking pin (not shown) is inserted through all three aligned holes.

The first or horizontal lock and motion assembly 20 includes two basic mechanisms: (1) a first lock mechanism 72; and (2) a first slow motion mechanism 74. The lock mechanism 72, as seen in FIGS. 5 and 6, is capable of locking or clamping onto a portion of the mounting frame 14, such being an arc plate 76, which projects outwardly from the lower side of right mounting plate 26. The slow motion mechanism 74, capable of movably adjusting the angular position of the mounting frame 14 relative to the platform 12 about vertical axis V when the lock mechanism 72 is locked onto the mounting frame 14, interconnects the first lock mechanism 72 to the platform 12.

More particularly, the first lock mechanism 72 of the horizontal assembly 20 includes a first clamp, generally designed 78, interfitted with the arc plate 76 and in the form of a C-shaped bracket 80 having a lower leg 82 with an inverted frusto-conical-shaped clamp element 84 on its outer end and an upper leg 86 with an outer end 88 which receives a threaded shaft 90 having a handle 92 on its upper end and a frusto-conical-shaped clamp element 94 on its lower end. By using the handle 92 to turn the shaft 90 counterclockwise, upper clamp element 94 is moved toward lower clamp element 84 for clamping the arc plate 76 therebetween. The origin of the radius of curvature of the outer vertical edge surface 96 on the arc plate 76 is located at the vertical axis V.

The first slow motion mechanism 74 of the horizontal assembly 20 includes a guide bar 98 supported by the lower leg 82 of C-shaped bracket 80 below the same and aligned with a pair of openings 100, 102 through opposite ends of a block 104 mounted on the platform 12. A first pair of plungers 106, 108 are mounted in the respective ends of the block 104 on either side of a flange 110 which is connected to and extends below the middle of the guide bar 98. One of the plungers 106 is threaded through a bore 112 into the one end of the block 104, while the other plunger 108 is (not shown) loaded by any suitable means such as a coil spring 113 (not shown) within a cylindrical recess 114 in the other end of the block 104 so as to cause engagement of the flange 110 by the plungers. A handle 116 on the threaded plunger 106 may be turned for movably adjusting the plunger 106 toward and away from the other plunger 108. As the plunger 106 so moves, the other plunger 108 is caused to retract and extend (due to being spring-loaded) into and from its recess 114 by the flange 110 moving correspondingly from right to left and from left to right, when viewed in FIG. 6. Thus, when the first clamp 78 is clamping the arc plate 76 so as to otherwise hold the mounting frame 14 in a fixed position relative to the platform 12, the angular position of the mounting frame 14 about the vertical axis V may still be adjustably changed relative to the platform 12 by an amount comparable to the distance or space between the opposite ends of the block 104, as seen in FIG. 6. This is accomplished by appropriately turning the handle 116 which through rotation of the threaded plunger 106 moves the flange 110 relative to the block 104 and, in so doing, correspondingly moves the mounting frame 14 relative to the platform 12.

Figure 4:
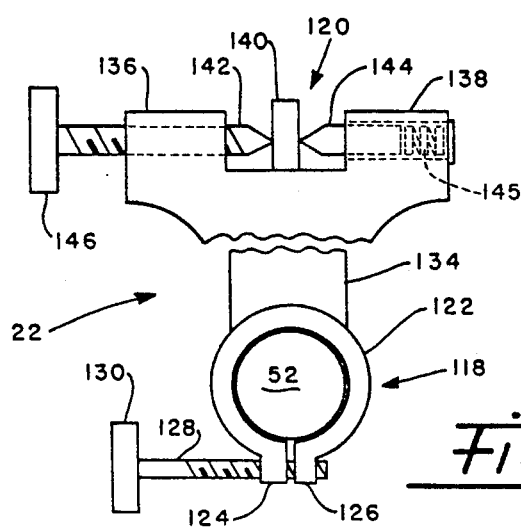
FIG. 4 is an enlarged fragmentary end elevational view of the vertical lock and motion assembly in the arrangement of FIG. 1.

The second or vertical lock and motion assembly 22 also includes two basic mechanisms: (1) a second lock mechanism 118; and (2) a second slow motion mechanism 120. The second lock mechanism 118, as seen in FIGS. 1, 2 and 4, is capable of locking or clamping onto a portion of the support frame 18, such being the outer end of the right stub shaft 52, which projects outwardly from the right support member 48 of the support frame 18. The second slow motion mechanism 120, capable of movably adjusting the angular position of the support frame 18 relative to the mounting frame 14 about horizontal axis H when the second lock mechanism 118 is locked onto the support frame 18, interconnects the second lock mechanism 118 to the mounting frame 14.

More particularly, the second lock mechanism 118 of the vertical assembly 22 includes a second clamp 122 fitted onto the outer end of stub shaft 52 and having outer threaded ends 124, 126 which receive a threaded shaft 128 with a handle 130 on its free end. By using the handle 130 to turn the shaft 128, the second clamp 122 may be tightened and untightened on the stub shaft 52.

The second slow motion mechanism 120 of the vertical assembly 22 includes an upright tab 132 mounted on the right collar 30 to which the right stub shaft 52 is mounted, and an upright link 134 mounted on the second clamp 122 and extending generally parallel and adjacent to the upright tab 132. A second pair of tubular elements 136, 138 are mounted to the upper end of the link 134 in spaced apart aligned relationship on either side of an upper outwardly-projecting portion 140 of the upright tab 132. A second pair of plungers 142, 144 are mounted in the respective tubular elements 136, 138 on either side of the tab upper portion 140 and extended toward the tab 132. One of the plungers 142 is threaded into the one tubular element 136, while the other plunger 144 is (not shown) loaded by any suitable means such as a coil spring 145 (not shown) within the other tubular element 138 so as to cause engagement of the tab 132 by the plungers. A handle 146 on the threaded plunger 142 may be turned for movably adjusting the plunger 142 toward and away from the other plunger 144. As the plunger 142 so moves, the other plunger 144 is caused to retract and extend (due to being spring-loaded) into and from its tubular element 138 by the upright link 134 moving correspondingly from left to right and from right to left, when viewed in FIGS. 1 and 4, due to the threaded coupling between the one plunger 142 and its tubular element 136. Thus, when the second clamp 122 is clamping the right stub shaft 52 so as to otherwise hold the support frame 18 in a fixed position relative to the mounting frame 14, the angular position of the support frame 18 about the horizontal axis H may still be adjustably changed relative to the mounting frame 14 by an amount comparable to the distance between the tubular elements 136, 138. This is accomplished by appropriately turning the handle 146 which through rotation of the threaded plunger 142 moves the link 134 relative to the tab 132 and, in so doing, correspondingly moves the support frame 18 relative to the mounting frame 14.

It is thought that the invention and many of its attendant advantages will be understood from the foregoing description and it will be apparent that various changes may be made in the form, construction and arrangement of the parts thereof described without departing from the spirit and scope of the invention or sacrificing all of its material advantages, the form hereinbefore described being merely a preferred exemplary embodiment thereof.

Having thus described the invention, what is claimed is:

1. In mounting arrangement for an instrument, such as an inertial measurement unit or the like, including a first frame for supporting said instrument, a second frame mounting said first frame and therewith said instrument for movement about a first axis, and a platform mounting said second frame and therewith said first frame and instrument for movement about a second axis extending in generally orthogonal relationship to said first axis, the improvement comprising:
    (a) a first lock and motion assembly interconnecting said second frame and platform, said first assembly including
        (i) first means for locking said second frame to said platform and
        (ii) first means for movably adjusting the angular position of said second frame relative to said platform about said second axis while said second frame is locked to said platform by said first locking means; and
    (b) a second lock and motion assembly interconnecting said first and second frames, said second assembly including
        (i) second means for locking said first frame to said second frame and
        (ii) second means for movably adjusting the angular position of said first frame relative to said second frame about said first axis while said first frame is locked to said second frame by said second locking means.

2. The mounting arrangement of claim 1, wherein:
said first locking means of said first assembly is lockable to said second frame; and
said first adjusting means of said first assembly interconnects said first locking means to said platform.

3. The mounting arrangement of claim 2, wherein:
said first locking means includes
    (i) means for clamping a portion of said second frame,
    (ii) means for actuating said clamping means to clamp onto, and unclamp from, said portion of said second frame; and
said first adjusting means includes
    (i) a pair of elements engaged with a portion of said platform,
    (ii) means interconnecting said elements and said clamping means, and
    (iii) means for movably adjusting said elements relative to said portion of said platform for changing the angular position of said second frame relative to said platform about said second axis when said clamping means is clamped onto said second frame.

4. The mounting arrangement of claim 1, wherein:
said second locking means of said second assembly is lockable to said first frame; and
said second adjusting means of said second assembly interconnects said second locking means to said second frame.

5. The mounting arrangement of claim 4, wherein:
said second locking means includes
    (i) means for clamping a portion of said first frame,
    (ii) means for actuating said clamping means to clamp onto, and unclamp from, said portion of said first frame; and
said second adjusting means includes
    (i) a pair of elements engaged with a portion of said second frame,
    (ii) means interconnecting said elements and said clamping means, and
    (iii) means for movably adjusting said elements relative to said portion of said second frame for changing the angular position of said first frame relative to said second frame about said first axis when said clamping means is clamped onto said first frame.

6. A mounting arrangement for an instrument, such as an inertial measurement unit or the like, comprising:
 (a) a support frame including right and left support members for mounting said instrument therebetween, and outwardly-projecting right and left aligned stub shafts fixedly attached on corresponding right and left support members at generally central locations between opposite ends of said members;
 (b) a mounting frame including a base member, right and left mounting members fixed on opposite ends of said base member, and right and left aligned collars fixedly attached on corresponding right and left mounting members, said right and left collars receiving said corresponding right and left stub shafts of said support frame for mounting said support frame and therewith said instrument to said mounting frame for movement about a horizontal axis;
 (c) a platform including means rotatably coupled to said base member of said mounting frame for mounting said mounting frame and therewith said support frame and instrument for movement about a vertical axis;
 (d) a horizontal lock and motion assembly comprising
  (1) a first lock mechanism including
   (i) an arc plate attached to and extending outwardly from one of said mounting members of said mounting frame,
   (ii) a first clamp interfitted with said arc plate, and
   (iii) means connected to said clamp for adjusting the same for clamping onto, and unclamping from, said plate, and
  (2) a first slow motion mechanism including
   (i) a block mounted on said platform,
   (ii) a flange fixed to said first clamp,
   (iii) said block having opposite ends disposed in spaced apart aligned relationship on either side of the flange,
   (iv) a first pair of plungers mounted in respective ends of said block on either side of said flange and extending from said ends toward said flange, one of said plungers being threaded into one of said block ends with the other plunger being spring-loaded against said other block end so as to cause engagement of said flange between said plungers, and
   (v) means on said one threaded plunger of said first pair thereof for movably adjusting said plunger toward and away from said other plunger for moving said flange of said first slow motion mechanism relative to said block whereby said angular position of said mounting frame may be adjustably changed relative to said platform about said vertical axis when said first clamp is clamping said arc plate; and
 (e) a vertical lock and motion assembly comprising
  (1) a second lock mechanism including
   (i) a second clamp mounted on one of said stub shafts on said members of said mounting frame,
   (ii) means for tightening and untightening said clamp on said stub shaft, and
  (2) a second slow motion mechanism including
   (i) an upright tab mounted on the one of said collars corresponding to said one of said stub shafts mounting said second clamp,
   (ii) an upright link mounted on said second clamp adjacent said upright tab,
   (iii) a second pair of tubular elements mounted to said link in spaced apart aligned relationship on either side of said tab,
   (iv) a second pair of plungers mounted in said respective tubular elements of said second pair thereof on either side of said tab and extending from said elements toward said tab, one of said plungers being threaded into one of said tubular elements with the other plunger being spring-loaded against said other tubular element so as to cause engagement of said tab between said plungers, and
   (v) means on said one threaded plunger of said second pair thereof for movably adjusting said plunger toward and away from said other plunger for moving said link of said second slow motion mechanism relative to said tab whereby said angular position of said support frame may be adjustably changed relative to said mounting frame about said horizontal axis when said second clamp is tightened on said one stub shaft.

* * * * *

UNITED STATES PATENT AND TRADEMARK OFFICE
CERTIFICATE OF CORRECTION

PATENT NO. : 4,448,377

DATED : May 15, 1984

INVENTOR(S) : Kurt D. Shinkle

It is certified that error appears in the above-identified patent and that said Letters Patent is hereby corrected as shown below:

Col. 4, line 39, delete "(not shown)"
Col. 4, line 40, delete "(not shown)"
Col. 5, line 30, delete "(not shown)"
Col. 5, line 31, delete "(not shown)"

Signed and Sealed this

Sixteenth Day of October 1984

[SEAL]

Attest:

GERALD J. MOSSINGHOFF

Attesting Officer

Commissioner of Patents and Trademarks